United States Patent [19]

Elsing

[11] 3,720,930

[45] March 13, 1973

[54] THERMAL EXPANSION COMPENSATOR

[75] Inventor: John W. Elsing, Edina, Minn.

[73] Assignee: Control Data Corporation, Minneapolis, Minn.

[22] Filed: June 5, 1972

[21] Appl. No.: 259,936

[52] U.S. Cl. ..........................................340/174.1 B

[51] Int. Cl. ...............................................G11b 5/48

[58] Field of Search..................340/174.1 B, 174.1 C

[56] References Cited

UNITED STATES PATENTS 3,553,662 1/1971 Goss ..............................340/174.1 B 3,531,789 9/1970 Hzlfhill et al...................340/174.1 B 3,576,553 4/1971 Hertrich........................340/174.1 B

*Primary Examiner*—Vincent P. Canney

*Attorney*—Joseph A. Genovese et al.

[57] ABSTRACT

Apparatus for compensating for the thermally induced dimensional variations in an arm carrying the read/write head and the recording disc having tracks on its flat surface which are accessed by the head in storing and retrieving data. The device has expansion members which simulate the dimensional variations in the arm and disc, thereby providing an accurate signal correction.

24 Claims, 6 Drawing Figures

THERMAL EXPANSION COMPENSATOR

BACKGROUND OF THE INVENTION

1. Field of the Invention

Broadly, this invention may be classified with all devices for accessing a magnetic disc recording track with a transducer head. More narrowly, the field covers improvements to data transducing heads which allow more accurate alignment of the head with the disc track.

2. Description of the Prior Art

Thermally induced dimensional changes have long been realized as the source of imprecise accessing of data tracks on a data storing disc pack. The errors caused by thermal dimensional changes may be adequately limited in initial startup in many cases by "pre-soaking" the individual disc packs in a chamber which raises the temperature of the individual pack to approximately that within the disc drive itself. Another technique, described in U. S. Pat. No. 3,531,789, Halfhill et al., involves approximating the dimensional change in a disc at room ambient temperature when first inserted in the drive, through the use of an analog circuit. A third solution is to have permanently recorded tracks, not used for data, on one disc surface in a multiple-disc drive, and reference these tracks as the other disc are referenced, to obtain positioning information. At the high densities (200 tracks per radial inch) which the current state of the art contemplates, only the third solution has been feasible. It is undesirable,however, because one disc surface is unavailable for data recording, increasing cost/track, and requiring more frequent changing of the disc pack itself.

SUMMARY OF THE INVENTION

The problem which this invention solves arises within a conventional disc memory when the disc and arm temperatures fluctuate with respect to the arm positioning apparatus. This may happen, e.g., when room ambient temperature varies. It almost always happens when a disc is replaced on the drive. In the conventional disc memory, an arm carrying the data transducing head is mounted on a carriage the arm positioning apparatus) slidably attached to a deck. Usually, the sliding motion is straight line. The disc or discs are mounted on a spindle which is rotatably attached to the deck at a point on or near the line of sliding of the carriage and are enclosed within a shroud through which the arm projects. Thus, when the carriage has been slid to a position close to the spindle, the innermost track on the disc can be accessed by the head. As the carriage is slid progressively further away from the spindle, the tracks toward the outer periphery of the disc are successively addressed. If the carriage is positioned to allow the head to access a certain specific track, and the ambient temperature of the arm and disc changes, the arm and disc dimensions will change, both expanding or contracting depending on the direction of temperature change. (Hereafter, "expansion" will include contraction as well, unless the context clearly indicates otherwise.) In either case, the errors will be additive, and tend to accentuate rather than diminish each other. Compensation for these errors is further complicated by the fact that for a given temperature change, the error contributed by the disc varies with the radius of the track accessed.

The apparatus of the invention provides compensation for these thermal effects. Its heart is a novel compensator strip assembly on which is placed a scale comprising markings which indicate the position of the data transducer head with respect to the disc spindle. These markings may be actual scribings on the strip, indicating the position of the strip relative to a market proximity sensor. Each scale marking is sensed by the sensor when the marking is within a predetermined signaling distance of a sensing point of the sensor. The position of the sensor relative to the marking must be capable of very accurate determination in order to correctly position the carriage with respect to the spindle. Thus, at 200 track/in. density, the sensor must detect variations in position of 0.001 in. or less. Such scale-sensor products are commercially available. The sensor is mounted to traverse the scale as the carriage shifts between outermost and innermost tracks. The sensor produces a market signal which changes when each marking, moving relative to the sensor, exceeds the predetermined signaling distance from the sensing point and another marking moves within this distance. This occurs when the carriage is being moved to allow the head to access another track. The type of sensor preferred electronically detects a series of null points in a precisely-generated magnetic field, each null point actually serving as a scale marking.

One preferred embodiment of the compensator strip comprises first and second strip segments joined at a junction point. In the simplest form, the first segment has a length at least equal to the radius of the outermost data track on the disc. It is made of material having static and dynamic thermal expansion properties similar to that of the disc. The second segment has a length at least equal to the fixed distance between the attachment points of the head and the carriage to the arm (arm length), and simulates the arm expansion. The second segment is formed of material having static and dynamic thermal expansion properties similar to that of the arm. The strip has a mounting point on the second segment located a distance from the junction point equal to the distance between the attachment points of the carriage and the head to the arm. The scale markings are placed between first and second points on the first segment of the strip which are located at a distance from the junction point equal, respectively, to the radii of the innermost and outermost tracks on the disc. The distance between successive markings may equal the distance between successive tracks. The compensator strip is fixed at its mounting point to the deck at a point in a plane passing through the axis of the spindle and perpendicular to the direction of motion of the carriage. The compensator strip is positioned to generally extend toward the carriage along a lone parallel to the motion of the carriage. The strip end adjacent the carriage may be conveniently supported by a flex strip which does not interfere with strip expansion, but prevents movement of the strip transverse to carriage movement. The sensor is attached at its mounting point to the carriage at a position which places its sensing point in fixed proximity to the surface carrying the scale markings as the carriage moves inwardly and outwardly. The sensor has a sensing point very near the mounting point. The sensor is attached by its mounting point to the carriage so as to keep the distance of the sensing point from the spindle axis equal to the distance between the attachment point of the arm to the carriage and the spindle axis as the carriage slides. The sensor will produce a signal caused by the close proximity of a first scale marking, which is relatively close to the junction points, when the head is accessing the innermost track on the disc. As the carriage moves outwardly, successive markings will be detected by the sensor, and a second scale marking relatively far from the junction point will be sensed when the outermost track is being accessed.

To illustrate how temperature compensation occurs, consider the carriage to be in a position allowing the head to access the innermost track. Disc and arm temperature increases, causing the arm, track radius, and compensator strip to all increase in length. In the preferred design, means are present to cause the ambient temperature to which each of these three elements is exposed during the change to be identical. In such a case, the second segment of the strip will expand an amount equal to the change in distance between the head and carriage. Similarly, the increase in radius of the track being access will be matched by the increase in distance between the marking being sensed and the junction point. This is true because the lengths of material in both disc and first strip segment subjected to thermal expansion and affecting position of the head relative to the track are equal. The distance the scale marking being sensed by the sensor moves is equal to the sum of the expansion of the first segment length between the sensed marking and the junction point, and the second segment. The expansion of the head arm and of the disc would normally cause the head to be out of register with the approximate track by an amount equal to the sensed scale marking movement. The apparatus which positions the carriage senses the scale marking movement in the signal from the sensor and moves the carriage slightly to re-register the marking. This movement causes registration of the head with the specified track to again become exact. If the made head accesses the outermost track, the error for a given temperature change will be greater than it was at the inside track because the thermal expansion occurs over a greater disc radius. Correspondingly, the marling on the compensator strip is similarly more distant and thus becomes out of registration with the sensor by a similarly greater amount. Similarly, compensation occurs for decreasing temperature. Automatically the differing amounts of thermally caused error are compensated for by use of this strip.

This choice of lengths for the strip segments and for the location of the mounting poins makes the implementation of this compensation scheme very convenient and the actual compensation quite accurate. By placing the strip and sensor mounting points at the specified positions relative the spindle and the arm, the positions of the scale markings and the head are referenced directly to the spindle axis. Therefore, deck and carriage expansion will not affect the placement of the carriage. Secondly, by starting with the various strip segment lengths and temperature coefficients identical to the corresponding disc drive element parameters, differences in lengths between two steady-state temperatures will be identical, allowing one-to-one pickoff from the scale marking and eliminating one set of variables in equalizing response to the thermal variations to which the disc drive is subject.

While the above design conditions will satisfactorily deal with slow, though possibly large, temperature variations, they are insufficient to cope with rapid temperature changes induced, e.g., by an air conditioner cycling room temperature rapidly In the disc drive employing one embodiment of this invention, the discs are quite thin, on the order of 0.050 in. Experiments indicate that ambient temperature changes will quickly cool or warm such discs. The arms, being very close to the disc, will remain very close to disc temperature. But the compensator strip is located further away, beneath the disc in most cases to permit easy replacing of disc packs, and is therefore not exposed as compleley to such temperature changes. Since the air affecting disc temperature is ejected at the periphery of the discs due to their rotation, and the mounting point of the strip is located adjacent the spindle, it will be impossible for this warmed air to be directed onto the second strip segment. Accordingly, in a preferred design, the second segment may be make hollow, with orifices near, respectively, the axis of the spindle and the periphery of the discs. Rotation of the discs causes slightly increased air pressure adjacent their periphery which causes inward flow of the warmer peripheral air through the second segment.

Accordingly, one object is to provide a mechanism precisely correcting for thermally induced inaccuracies in the accessing of data tracks on a magnetic disc.

A second object is to eliminate the effects of various types of thermal variations in the carriage deck, and disc chamber.

Another object is to provide an inexpensive apparatus making such corrections.

Yet another object is to increase data storage capacity of magnetic disc recorders.

Other objects will become apparent in the following description of the invention.

DESCRIPTION OF THE PREFERRED EMBODIMENTS

Figure 1:
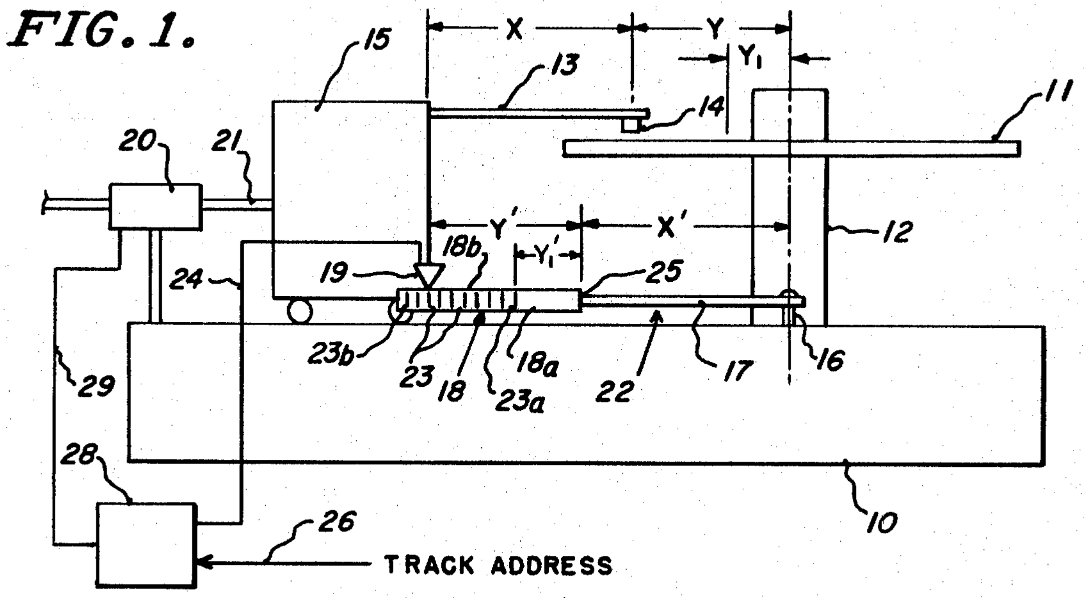
FIG. 1 shows the mechanical elements of a conventional magnetic disc memory and their relationship to the compensator strip of the invention.

Shown in FIG. 1 is a deck 10 on which carriage 15 is mounted to permit straight line sliding over a predetermined distance. On carriage 15 is mounted head arm 13 in a cantilevered relationship and generally extending in a direction parallel to the line of sliding motion of carriage 15. Spindle 12 is rotatably attached to deck 10 adjacent arm 13 at a point on the line of sliding of carriage 15, with its axis of rotation perpendicular to the line of sliding. Disc 11 is mounted on spindle 12 so as to place its flat surfaces perpendicular to the axis of spindle 12 and at a predetermined vertical distance from head arm 13. Data transducing head 14 is mounted at the end of head arm 13 with its transcribing surface adjacent the surface of disc 11, thereby allowing data to be transcribed to and from disc 11 as disc 11 rotates. Disc 11 is rotated by a drive motor contained within deck 10 and not shown in FIG. 1. A plurality of concentric circular data tracks are present of disc 11, and by sliding carriage 15 to the appropriate point, and desired track may be accessed by head 14. Automatic motion of carriage 15 is caused by voice coil 20 attached to deck 10 and acting upon its armature 21 which is in turn attached to carriage 15. Armature 21 position is controlled by a signal to voice coil 20 supplied on line 29 by control unit 28. Control unit 28 receives on input line 26 a signal specifying the address of the desired track to be accessed by head 14. A second input 24 to control unit 28 is a marking signal from marking proximity sensor 19. Sensor 19 is attached by its mounting point to carriage 15 so as to place a sensing point on it directly below the point where head arm 13 is attached to carriage 15. Sensor 19 supplies a marking signal indicating position of scale markings 23 with respect to the sensing point. I.e., as the sensing point moves with respect to scale markings 23, within a predetermined signaling distance, the marking signal varies. Scale markings 23 are on first strip segment 18, forming part of compensator strip assembly 22. Strip 22 further comprises second strip segment 17 joined to first strip segment 18 at junction point 25. Strip 22 is attached to deck 10 by clamp or pin 16 which fixes a mounting point at the end of segment 17 with respect to spindle 12. The mounting point is attached to deck 10 in a plane passing through the axis of spindle 12 and perpendicular to the movement of carriage 15. Strip 22 is supported adjacent first strip segment 18 by flex strips 35*a* and 35*b* (shown in FIGS. 5 and 6) which position segment 18 a precise distance from sensor 19 and yet provide little opposition to expansion of strip 22.

The compensator strip assembly must be located in a position where it is subjected to temperature changes similar to those affecting head arm 13 length and disc 11 radius. This is not a trivial aspect to the invention. Discussion of this point will, however, be deferred until operation of the various compensator strip assembly embodiments have been explained. For the time being, assume only that strip 22 temperature "tracks" the temperature of head arm 13 and disc 11. i.e., these temperatures differ, if at all, by a fixed number of degrees.

In the preferred embodiment, the markings 23 actually comprise a plurality of magnetic nulls created by winds on strip segment 18 of compensator strip 22. Sensor 19 comprises another set of windings. Windings forming markings 23 are excited by a 50 khz. electrical voltage. As sensor 19 moves past each loop, voltage is induced in the windings of sensor 19 and reaches a null as each winding coincides with the sensing point. While each null point or marking may not coincide exactly with a winding, for illustrative purposes and to simplify the discussion, the terms will be used interchangeably. Such position indicators are well known to those skilled in the art. Control unit 28 counts the number of occurrences of nulls and the direction carriage 15 is moving when each is detected, thereby determining the position of the carriage with respect to the markings on compensator strip 22 and hence the position of head 14 with respect to spindle 12. This position information is compared with the position of the track specified by the track address received at input 26 by control unit 28, which then transmits a control signal to voice coil 20. Voice coil 20, is thereby actuated to move armature 21, positioning carriage 15 to allow transducer head 14 access to the specified track. Control unit 28 monitors head 14 position as sensed by sensor 19 and when it coincides with the position specified by the track address received at input 26 control unit 28 causes voice coil 20 to cease moving armature 21.

In a preferred embodiment, the winding comprising markings 23 forms successive null points each separated by 0.005 inch. Similarly, the difference in adjacent track radii is 0.005 inch. Hence, a simple equidistance relationship exists between the two. The counter in control unit 28 need merely count successive signal nulls as the carriage moves, and the direction of movement, to identify the track being accessed by head 14. In the preferred embodiment, the dimensions and materials of strip 22 are selected to provide thermal expansion and rate of expansion in the strip exactly equaling the dynamic thermally caused error in head and disc registration on the tracks. First strip segment 18 has a first marking 23*a* whose distance from junction point 25 is equal to the innermost track radius on disc 11. It also has a second marking 23*b* whose distance from junction point 25 is equal to the outermost track radius on disc 11. The material (most frequently aluminum) from which first segment 18 is made is the same as the material of disc 11, and is of similar thickness, thereby causing identical expansion and rate of expansion, per unit length, for a specified temperature change. Second strip segment 17 is similarly selected to have all dimensions between its mounting point and junction point 25 exactly equal to those of head arm 13 between its attachment points to carriage 15 and head 14. And the material from which head arm 13 and second strip segment 17 are made is identical.

If ambient air temperature of the head arm 13, disc 11, and compensator strip 22 of FIG. 1 should increase, strip 22 will expand, and sensor 19 will no longer be at the null point. The temperature increase also causes head 14 to lose its precise registration with the specified track on disc 11. Disc 11, by expanding, has displaced the track to the left of head 14. Similarly, head arm 13, by expanding, has shifted head 14 to the right of its original position. The distance separating the correct position of head 14, which would provide exact registration of head 14 with the specified track, from the actual position of head 14 is precisely equal to the movement necessary by carriage 15 to reestablish the null position of sensor 19. This is because the expansion of second segment 17, i.e., the change in X', is precisely equal to the expansion of head arm 13 between carriage and head (the change in X), and the expansion of first segment 18 between junction point 25 and that one of markings 23 being sensed by sensor 19, Y', is precisely equal to the increase in radius of the accessed track caused by expansion of disc 11, the change in Y. Sensor 19, chosen to detect errors as small as a few ten thousandths of an inch, signals control unit 28 of the out-of-registration condition. Control unit 28 reacts by supplying a signal to voice coil 20 causing carriage 15 to shift appropriately to correct the error. In effect a small servo loop exists, with the scale marking signal on line 24 serving as the error signal, its predetermined correct value as the set point, and the voice coil control signal on line 29 as the feedback or control signal.

It might seem that control unit 28 would be unable to determine whether a dimensional change in strip 22 is an expansion or a contraction. However, control unit 28 is designed to signal voice coil 19 to cause carriage 15 to constantly "hunt" around the null point. This hunting is so frequent and fast that even though the movement is very small, less the 1/10,000 inch, expansion of strip 22 can never be rapid enough to move the desired null point outside the hunting range. As long as the null point stays within this range, the detection of the null during each hunting cycle allows control unit 28 to readjust carriage 15 position to place the null point close to the center of the hunting range, with such accuracy that addressing of the addressed track is unaffected.

Figure 2:
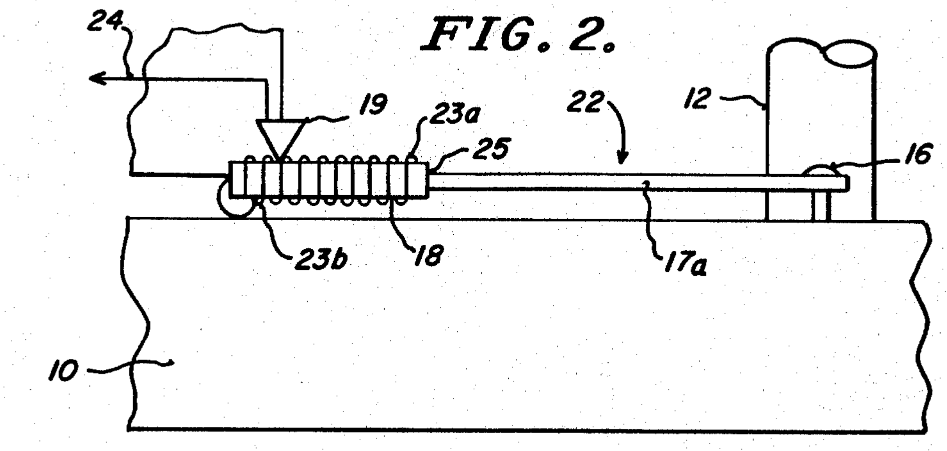
FIG. 2 shows an alternative preferred embodiment of the compensator strip.

FIG. 2 displays a second embodiment of compensator strip assembly 22. In FIG. 1, a portion **18*b* of first segment 18 simulates the expansion of the part of disc 11 carrying the tracks. Portion 18*a*, on the right hand side of first segment 18, simulates the expansion of disc 18 inside the innermost track. It is convenient to purchase the "18*b*" part of first segment 18 (carrying the scale markings) as an off-the-shelf item, not having the "18*a*" unmarked length. By simply attaching the marked segment to a third segment duplicating the length and thermal expansion characteristics of portion 18*a*, expansion of strip 22 will be unaffected. An alternative to this embodiment, is to replace second segment 17 and first segment portion 18*a* with a single homogeneous segment 17*a* of FIG. 2. Segment 17*a* has length $Y_1' + X'$ (see FIG. 1) and a coefficient of thermal expansion equal to the weighted average of second segment 17 and first segment portion 18*a*. Algebraically the formula for the coefficient of thermal expansion of segment 17*a*, $\alpha$ (17*a***) is $$\alpha(17a) = [\alpha(18a)\ Y1' + \alpha(17)\ X']/(Y_1' + X')$$

where $\alpha$(**18*a*) and $\alpha$(17) are the coefficients of thermal expansion of first segment portion 18*a* and second segment 17, respectively. In a prototype system, where head arm 13, and hence second segment 17, were fabricated of stainless steel with $\alpha(17)\ 6 + 10^{-6}$ in./in. 1°F. and disc 11 and first segment 18 were made from aluminum with $\alpha(18) = 12 \times 10^{-6}$ in./in./°F., $X$ and $X'$ =3.3 in. and $Y$ and $Y'$ ranged from 4.5 in. to 6.5 in. Length $Y_1'$ of first segment 18** was 4.5 in. Thus, $$\alpha(17a) = \frac{4.5(12)+3.3(6)}{4.5+3.3}\ (10^{-6})\ \text{in./in./°F.}$$

$$= 9.5\ \text{in./in./°F.}$$

This is sufficiently close to the $\alpha$ for some types of brass, and so segment **17*a* was made from this material. For different disc and arm materials and dimensions, different materials for segment 17*a*** may be used.

Point 25 on segment **17*a* corresponds in a general way to junction point 25 on FIG. 1, in that segment 17*a* the right of point 25 in FIG. 2) has an amount of expansion for a given temperature change equal to the combined expansion of second segment 17 and portion 18a of segment 18 in FIG. 1. Since the combined length of segments 17a and 18 and their total expansion for a given temperature change is identical to that of strip assembly 22 of FIG. 1, assembly 22 of FIG. 2 is interchangeable with assembly 22 of FIG. 1**.

It should be realized that these embodiments are only exemplary. The basis of the invention is to simulate the expansion of the disc and arm with the expansion of strip 22. This can be done in many ways. It is very convenient, but not necessary that the distance between the sensing point and the strip mounting point be identical to the lengths in disc 11 and arm 13 involved. If the entire strip were to be reduced in size by one-half, and a servo or lever arrangement used to decrease sensor 19 movement by one-half as well, the device would still theoretically operate. Practical considerations, such as additional expense, expansion of the linkage, backlash, etc. probably would make commercial success unlikely, but the theoretical basis would not be affected. Similarly, even though length of strip 22 is as shown, the relative percentages of total strip length each segment comprises need not be as shown in either embodiment. Second segment 17 of FIG. 1 could be composite, made of two lengths of material having a weighted average expansion equaling that of arm 13. The necessary conditions in the equal length situation of the preferred embodiments are that a) the distance between the markings for the inner and outer tracks equal the difference between the radii of these tracks; b) that the expansion of first segment part 18b between these markings be equal to the change in the difference between these tracks and uniform, for a given temperature change; and c) that the expansion between marking **23*a* (for the inner track) and the mounting point be equal to the combined increase of the length of arm 13** and the inner track radius $Y_1$, for a given temperature change.

While the basic invention need not have the sensing point directly beneath the point at which head arm 13 is attached to carriage 15 and the mounting point directly beside the axis of spindle 12, great advantages are realized by so doing in that effects of carriage and deck expansion can be completely eliminated. Obviously, if these conditions are imposed, the length requirement just discussed must be satisfied as well.

Figure 3:
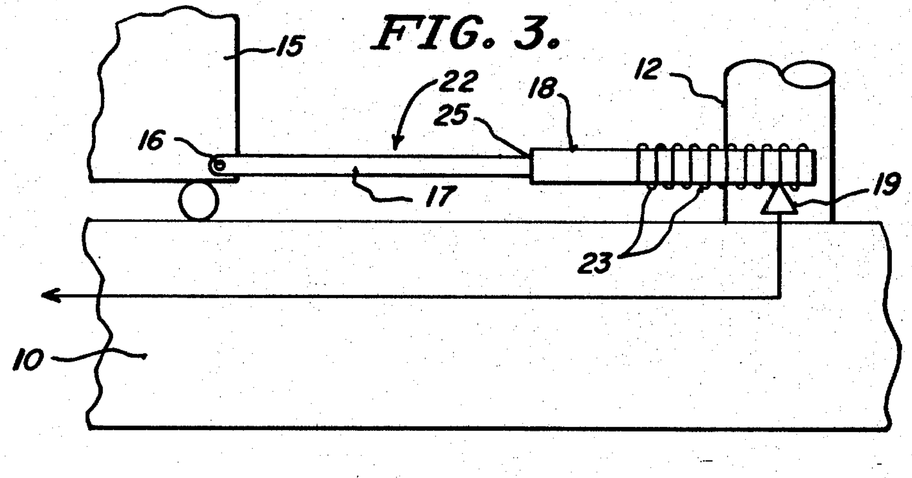
FIG. 3 shows an alternative attachment displayed of the sensor and compensator strip assembly.

Referring next to FIG. 3, the alternative embodiment shown reverses the attachment location of the mounting points of sensor 19 and strip 22. Operation is identical to that of the apparatus shown in FIG. 1. In high speed operations, it is inferior to that of the apparatus of FIG. 2, because second segment 17 must provide force to accelerate segment 18 during accessing of a new track which can cause undesirable vibrations to be set up in strip 18, leading to less precise sensing by sensor 19. However, the fact that fewer conductors need be led to strip 22, which is the moving element, than to sensor 19, which is fixed, for most types of markings and sensing employed, has advantages in lower speed application. The fact that in this embodiment the strip segments simulating arm 13 and disc 11 expansion are positioned relative to each other as the arm is positioned relative to the disc, also has advantages in attempting to maintain equal temperatures for these parts of the apparatus.

It theoretically is not necessary that strip 22 temperature track head arm 13 and disc 11 temperature (i.e., that temperatures differ, if at all, by a fixed number of degrees at all times). Control unit 28 can perform a correction once the functional relationship between these temperatures has been determined. However, it is much to be preferred that not only strip 22 temperature track the others, but that they nearly equal at all times. Experience has shown that the equal temperature condition is easiest of all to design into the disc drive assembly with reliability. The mathematical analysis of compensator strip 22 design is greatly simplified as well.

Figure 4:
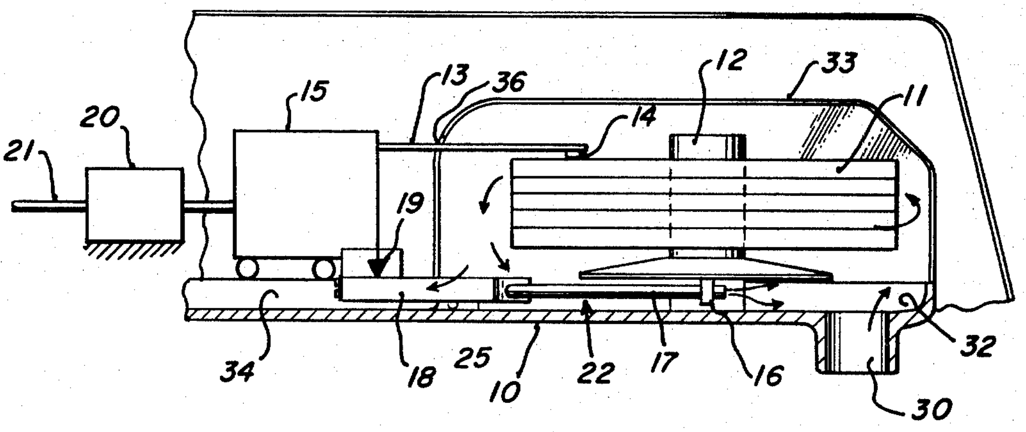
FIG. 4 and 5 display side and top views of an operating system and the air flow paths therein.

Referring to FIG. 4, therein is shown an operational adaptation of FIG. 2 with the addition of a shroud 33 enclosing disc 11 and having an aperture 36 therein through which head arm 13 passes in accessing a track on discs 11. A compressed air source delivers air through an aperture 30 from under deck 10 into shroud 33. Strip 22 is placed in channel 34, located just under shroud 33. Initially, consider strip 22 to have the simple design of FIG. 1. Air exits from shroud 33 through aperture 36 and channel 34, passing by the parts of head arm 13 and strip 22 both inside and outside shroud 33, and makes the temperature of these elements very close to that of the air within shroud 33. Since discs 11 are usually quite thin (0.050 in. in one current version), variations in entering air temperature will instantly change the temperature of discs 11. By making strip 22 from similarly thin material, response will be similarly rapid. Arms 13 are also made from thin stock and change temperature quickly with varying temperature of air entering at aperture 30.

Figure 5:
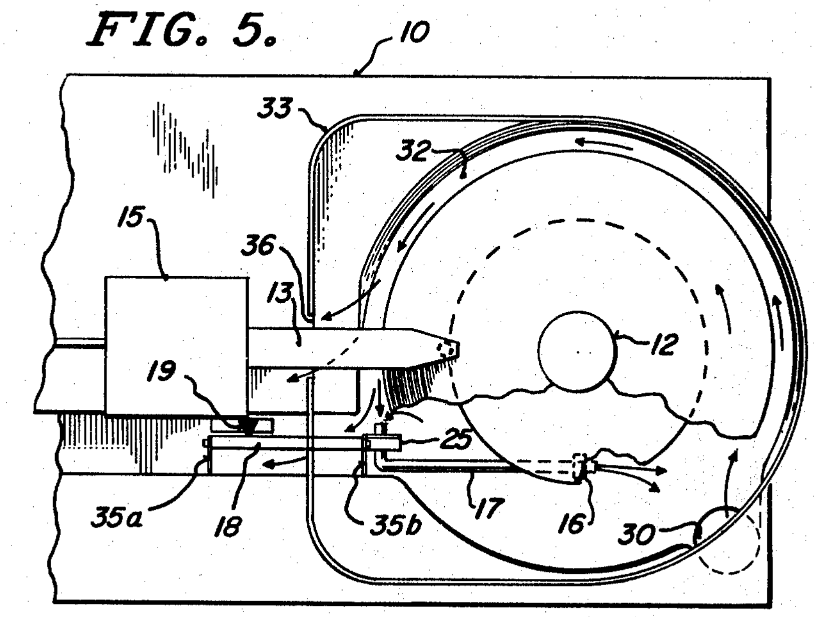

While the simple version of the apparatus of FIG. 4 compensates well for variations in the temperature of entering air, several other factors must be considered to achieve precise correction. Rotation of discs 11 tends to warm air adjacent them. Since the air is centrifugally accelerated by disc 11, it moves toward the outer volume of shroud 33 in a spiral path. As disc 11 speed is higher at its edge than in the center, the air heated near spindle 12 must pass by the outer edge of discs 11, a temperature gradient exists within discs 11 and the surrounding air, with the air near spindle 12 cooler than that at the edges of discs 11. Thus, second segment 17 will not be uniformly heated, being cooler at its right end than its left as shown in FIG. 4. Since strip 22 cannot be conveniently located between a pair of discs 11, because in normal operation discs 11 are frequently changed, it is located beneath them, and air flow from discs 11 past strip 22 is not as fast as desired. Accordingly, an improved embodiment of strip 22 has segment 17 comprising a thin-wall (0.025 in.), hollow tube bent as shown in FIG. 5 to have its left hand portion nearly tangential to discs 11. The rotation of discs 11 tends to create a pressure, as well as a temperature, gradient increasing radially. Therefore, as shown in FIGS. 4 and 5, air from the warmer part of discs 11 will constantly flow through segment 17 because of the pressure differential.

Several advantages result from this arrangement. Heated air flows through segment 17. Since segment 17 simulates expansion of head arm 13, which is directly exposed to the stream of heated air exiting shroud 33 through aperture 36, segment 17 will more accurately reflect the expansion of head arms 13. The left ends of head arms 13 will be less affected by this exiting air because it dissipates after exiting. Segment 17 will expand less per unit length toward its right end, because the temperature difference between it and the air flowing through it decreases toward that end. Therefore, segment 17 simulates the temperature profile in head arms 13. The left ends of head arms 13 will be less affected by this exiting air because it dissipates after exiting.

Figure 6:
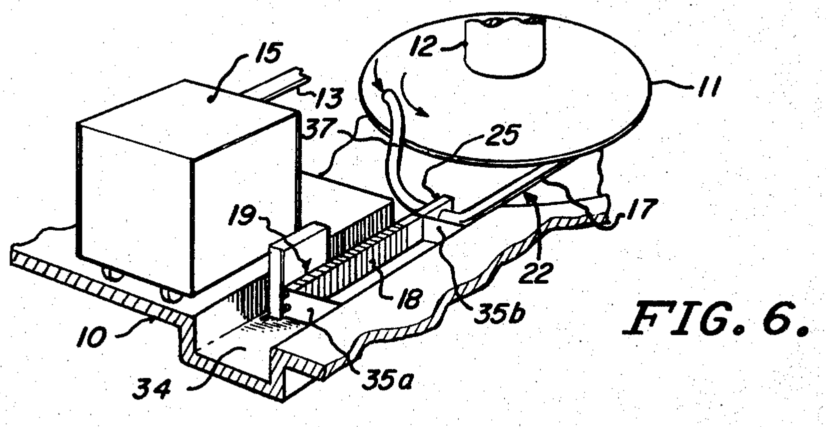
FIG. 6 displays a preferred method of mounting the compensator strip, and a preferred shape thereof.

It is possible to improve on this simulation even more by employing flexible tube or hose 37 shown in FIG. 6 attached at one end to the left end of segment 17. Hose 37 picks off air surrounding discs 11 very near aperture 36 where the heated air affects head arms 13 most of all. Thus, segment 17 is directly exposed to a significant amount of air at exactly the temperature affecting head arm 13 temperature.

Many other variants on this invention are possible.

Not wishing to be restricted in the scope of protection by the preceding description of the invention, but only by the following, what I claim is:

1. Apparatus for correcting track addressing errors caused by thermally induced dimensional variations in the disc, head arm, carriage and deck of a conventional disc memory, comprising:
   a. a compensator strip element comprising
      i. a first segment having a plurality of scale markings thereon and having thermal expansion characteristics simulating the radial thermal expansion of at least the part of the disc on which the tracks are placed;
      ii. a second segment contiguous with the first segment at a junction point, and having thermal expansion characteristics simulating the longitudinal thermal expansion of the head arm and the radial thermal expansion of any part of the disc within the innermost track not followed by the first segment, and having upon it a mounting point spaced apart from the junction point;
   b. a sensor element having sensing and mounting points and supplying a marking signal indicating the distance of a scale marking from the sensing point;
   c. means for attaching one of the elements to the deck by its mounting point, and the other by its mounting point to the carriage, and positioning the elements to cause the scale markings to pass by the sensor as the carriage moves relative to the disc and the sensor to supply a marking signal specifying the distance of the carriage from the disc; and
   d. temperature equalizing means for causing the compensator strip to follow the temperature variations of the disc and the head arm.

2. The apparatus of claim 1 wherein the first segment of the compensator strip has a first marking spaced apart from a second marking by a distance equal to the difference between the radii of first and second tracks on the disc, and has a coefficient of thermal expansion substantially equal to that of the disc.

3. The apparatus of claim 1 wherein the second segment of the compensator strip has i) length between the mounting point and the junction point equal to the distance between the attachment points of the head and the carriage to the head arm plus the radius of any part of the disc whose thermal expansion characteristics are not simulated by the first segment; and ii) has a coefficient of thermal expansion substantially equal to the weighted average of the coefficients of thermal expansion of these lengths.

4. The apparatus of claim 1 wherein the element attaching means further comprises means for attaching the sensor at its mounting point to the carriage in a position placing the sensing point in a plane passing through the attachment point of the head arm to the carriage and perpendicular to the motion of the carriage.

5. The apparatus of claim 1 wherein the element attaching means further comprises means for attaching the compensator strip at its mounting point to the deck in a position placing its mounting point in a plane adjacent the spindle axis and perpendicular to the motion of the carriage.

6. The apparatus of claim 1 wherein the first segment of the compensator strip comprises material having thermal expansion substantially equal to that of the disc.

7. The apparatus of claim 1 wherein the sensor comprises a winding, and the scale markings on the compensator strip comprise a plurality of windings creating a series of magnetic variations along the length of the first segment sequentially detectable by the winding comprising the sensor, as the carriage moves with respect to the disc.

8. The apparatus of claim 1 wherein the first segment of the compensator strip comprises material having a thermally induced dimensional change rate substantially equal to that of the recording disc, and having the distance between two scale markings substantially equal to the differences between the radii of the first and second tracks, respectively.

9. The apparatus of claim 8 wherein the sensor comprises a magnetic null sensing winding, and the scale markings on the strip are formed by windings forming a plurality of magnetic nulls adjacent to and along the length of the first segment.

10. The apparatus of claim 1 further comprising means for causing the ambient temperature of the strip and the head arm to follow the ambient temperature of the disc.

11. The apparatus of claim 10 wherein the temperature equalizing means comprises means for supplying air adjacent the periphery of the disc to the head arm and the strip.

12. The apparatus of claim 10 wherein the temperature equalizing means comprises a shroud enclosing the disc and at least portions of the head arm and the compensator strip, and a compressed air source propelling air adjacent the disc past the strip and the head arm.

13. The apparatus of claim 12 wherein the strip further comprises a longitudinal section thereof having a bore therethrough, and wherein the apparatus further comprises means for forcing air adjacent the periphery of the disc through the bore.

14. The apparatus of claim 12 wherein the strip further comprises a longitudinal section thereof having a bore therethrough, and wherein the bore is located with one orifice substantially closer to the spindle axis than the other.

15. The apparatus of claim 14 wherein the element attaching means includes a member attaching the strip at its mounting point to the deck beneath the disc in a plane passing through the spindle axis and perpendicular to the carriage motion, and positioning the strip to extend toward the carriage substantially parallel to the carriage motion; and wherein the second segment comprises a tube having a bend adjacent the junction point pointing the orifice of the tube toward the direction of motion of the disc periphery.

16. The apparatus of claim 15 further comprising a hose attached at a first end to the tube end adjacent the junction point and having its second end adjacent the periphery of the disc and directly facing the direction of motion of the disc periphery.

17. The apparatus of claim 1 further comprising a support member relatively flexible in a first direction and relatively rigid at right angles thereto and attached to the deck and the first strip segment with the first direction substantially parallel to the length of the strip.

18. The apparatus of claim 17 wherein the support member comprises a thin beam easily bendable in a first direction and relatively rigid at right angles thereto and attached between the first strip segment and the deck with the first direction substantially parallel to the direction of strip expansion.

19. The apparatus of claim 1 wherein the second segment of the compensator strip comprises material having a weighted average thermal expansion coefficient and a thermally induced dimensional change rate substantially equal to those of the head arm and any part of the disc whose expansion is not simulated by the first segment, and having distance from the junction point to the first mounting point substantially equal to the distance between the attachment points of the head arm to the carriage and the head, plus the radius of any part of the disc whose expansion is not simulated by the first segment.

20. Apparatus for correcting track addressing errors caused by thermally induced dimensional variations in the disc, head arm carriage and deck of a conventional disc memory, the disc having innermost and outermost tracks thereon of first and second radii, respectively, comprising:

a. a compensator strip element comprising first and second segments contiguous at a junction point, the first segment having a plurality of scale markings thereon including first and second scale markings on the same side of and respectively nearer and further from the junction point and spaced from each other by the difference between the first and second radii, and having thermal expansion characteristics duplicating those of the disc, and the second segment having a mounting point distant from the junction point equal to the sum of the head arm length between the carriage and the head and the first radius less the distance of the first scale marking from the junction point and having thermal expansion characteristics duplicating the composite characteristics of the head arm and any part of the disc within a concentric circle having a radius equal to the first radius less the distance between the first scale marking and the junction point;

b. a sensor element having sensing and mounting points, and supplying a marking signal indicating the distance of a marking from the sensing point;

c. means for attaching one element to the deck by its mounting point and the other by its mounting point to the carriage and positioning the elements to cause the sensing and mounting points of the sensor to define a line substantially perpendicular to carriage motion, and the scale markings to pass by the sensor as the carriage moves relative to the disc and cause the sensor to supply a marking signal indicating the distance of the carriage from the disc; and d. temperature equalizing means for causing the compensator strip to follow the temperature variations of the disc and the head arm.

21. The apparatus of claim 20 wherein the element attaching means comprises means for attaching the sensor to the carriage placing the sensing and mounting points in the plane passing through the attachment point of the arm to the carriage and perpendicular to carriage motion.

22. The apparatus of claim 20 wherein the second segment comprises a tube having walls no thicker than the thickness of the disc, and means for causing air at the periphery of the disc to flow through the bore of the tube.

23. The apparatus of claim 22 wherein the temperature equalizing means comprises the deck and a shroud surrounding the disc, in combination providing means for allowing air adjacent the disc periphery to flow past at least parts of the compensator strip and the head arm, and through the bore of the tube, and further including a compressed air source continually introducing outside air into the chamber.

24. The apparatus of claim 20 wherein the second segment comprises a tube attached at its mounting point near the spindle beneath the disc and extending past the junction and terminating with its orifice facing opposite the direction of motion of the disc edge.

* * * * *